United States Patent [19]

Turner et al.

[11] Patent Number: 4,642,320
[45] Date of Patent: Feb. 10, 1987

[54] REACTION INJECTION MOLDED POLYUREAS EMPLOYING HIGH MOLECULAR WEIGHT AMINE-TERMINATED POLYETHERS

[75] Inventors: Robert B. Turner; Richard D. Peffley; James A. Vanderhider, all of Lake Jackson, Tex.

[73] Assignee: The Dow Chemical Company, Midland, Mich.

[21] Appl. No.: 747,071

[22] Filed: Jun. 19, 1985

Related U.S. Application Data

[63] Continuation-in-part of Ser. No. 548,179, Nov. 2, 1983, Pat. No. 4,530,941, which is a continuation-in-part of Ser. No. 461,046, Jan. 26, 1983, abandoned.

[51] Int. Cl.$^4$ .................. C08G 18/14; C08G 18/32; C08G 18/48; C08G 18/65
[52] U.S. Cl. .................. 521/176; 264/51; 264/328.6; 521/133; 521/161; 521/163; 521/164; 521/167; 521/175; 521/902; 528/73; 528/76; 528/77; 528/78
[58] Field of Search .............. 521/161, 163, 164, 167, 521/175, 176, 902; 528/73, 76, 77, 78; 264/51, 328.6

[56] References Cited

U.S. PATENT DOCUMENTS

| | | | |
|---|---|---|---|
| 3,155,657 | 11/1964 | Bedoit | 260/247 |
| 3,155,728 | 11/1964 | Lesesne | 260/584 |
| 3,161,682 | 12/1964 | Lesesne et al. | 260/584 |
| 3,179,606 | 4/1965 | Prescott et al. | 260/2.5 |
| 3,231,619 | 1/1966 | Speranza | 260/584 |
| 3,236,895 | 2/1966 | Lee et al. | 260/584 |
| 3,267,050 | 8/1966 | Kuryla et al. | 260/2.5 |
| 3,436,359 | 4/1969 | Hubin et al. | 260/2 |
| 3,558,529 | 1/1971 | Whitman et al. | 260/2.5 |
| 3,654,370 | 4/1972 | Yeakey | 260/584 B |
| 3,660,319 | 5/1972 | Yeakey | 260/2.5 AC |
| 3,666,788 | 5/1972 | Rowton | 260/465.5 R |
| 3,668,173 | 6/1972 | Wooster et al. | 260/32.6 N |
| 3,684,770 | 8/1972 | Meisert et al. | 260/75 NP |
| 3,714,128 | 1/1973 | Rowton | 260/77.5 CH |
| 3,838,076 | 9/1974 | Moss et al. | 260/2.5 AQ |
| 3,847,992 | 11/1974 | Moss | 260/584 B |
| 4,048,105 | 9/1977 | Salisbury | 260/2.5 AC |
| 4,049,636 | 9/1977 | Mao et al. | 260/77.5 CR |
| 4,049,716 | 9/1977 | Collet | 528/60 |
| 4,070,530 | 1/1978 | Hobbs | 526/7 |
| 4,102,833 | 7/1978 | Salisbury | 521/159 |
| 4,107,106 | 8/1978 | Dunleavy et al. | 521/164 |
| 4,133,943 | 1/1979 | Blahak et al. | 521/163 |
| 4,246,363 | 1/1981 | Turner et al. | 521/163 |
| 4,269,945 | 5/1981 | Vanderhider et al. | 521/159 |
| 4,433,067 | 2/1984 | Rice et al. | 521/51 |
| 4,444,910 | 4/1984 | Rice et al. | 521/51 |

FOREIGN PATENT DOCUMENTS

| | | | |
|---|---|---|---|
| 784293 | 4/1968 | Canada | 401/54 |
| 863223 | 2/1971 | Canada | 18/126.5 |
| 81701 | 11/1983 | European Pat. Off. | |
| 2751923 | 5/1978 | Fed. Rep. of Germany | |
| 1233614 | 5/1971 | United Kingdom | |
| 1534258 | 11/1978 | United Kingdom | |

OTHER PUBLICATIONS

Wilkes et al., J. Macromol. Sci.-Phys. B7(1), pp. 157-175, 1973, "Investigation of Domain Structure".
Rowton, J. of Elastomers and Plastics, vol. 9, Oct. 1977, pp. 365-375, "Cyanoethylated Polyoxypropylene-polyamines".
"The Bay Flex 110 Series—The New Generation of RIM Materials", W. A. Ludwico et al., Sep. 26-30, 1977.
"The Properties of High Modules RIM Urethanes", R. M. Gerkin et al., Sep. 26-30, 1977.
R. Bonart, J. Macromol. Sci.-Phys. B2(1), pp. 115-138, Mar. 1968, "X-Ray Investigations in Segmented Urethane Elastomers".
Wischmann et al., "Removable Polyurethane Encapsulants", J. of Elastomers and Plastics, vol. 9, Jul. 1977, pp. 299-311.

*Primary Examiner*—Herbert S. Cockeram
*Attorney, Agent, or Firm*—Gary C. Cohn

[57] ABSTRACT

Reaction injection molded polyurethanes prepared from a composition comprising (A) a relatively high molecular weight polyol, (B) a chain extender and (C) an aliphatic polyisocyanate or polyisothiocyanate are improved by replacing a portion of the relatively high molecular weight polyol with an aminated or partially aminated polyoxyalkylene material.

7 Claims, No Drawings

REACTION INJECTION MOLDED POLYUREAS EMPLOYING HIGH MOLECULAR WEIGHT AMINE-TERMINATED POLYETHERS

CROSS REFERENCE TO RELATED APPLICATION

This is a continuation-in-part of application Ser. No. 548,179 filed Nov. 2, 1983, now U.S. Pat. No. 4,530,941, which is a continuation-in-part of application Ser. No. 461,046 filed Jan. 26, 1983 and now abandoned.

BACKGROUND OF THE INVENTION

Reaction injection molded polyurethanes are well known in the art as described in a paper entitled "THE BAYFLEX 110 SERIES—THE NEW GENERATION OF RIM MATERIALS", by W. A. Ludwico and R. P. Taylor presented at the SOCIETY OF AUTOMOTIVE ENGINEERS PASSENGER CAR MEETING, Detroit, Mich., Sept. 26-30, 1977; a paper entitled "THE PROPERTIES OF HIGH MODULUS RIM URETHANES", by R. M. Gerkin and F. E. Critchfield presented at the above meeting; British patent No. 1,534,258 titled "PROCESS FOR THE PRODUCTION OF ELASTOMERIC POLYURETHANE-POLYUREA MOULDED PRODUCTS HAVING A COMPACT SURFACE SKIN" and a book by F. Melvin Sweeny entitled *INTRODUCTION TO REACTION INJECTION MOLDING*, Technomics, Inc., 1979.

These systems employ, as chain extenders, diols, aromatic amines, cyanoethylated polyoxyalkylene amines and mixtures thereof.

It has been thought that as a general rule the aliphatic amines were too fast to be suitably employed in RIM urethane applications. Vanderhider and Lancaster in U.S. Pat. No. 4,269,945 discovered that low molecular weight aliphatic amine compounds could be employed as a part of the chain extender system when employed as a mixture with either or both of such materials as hydroxyl-containing materials and aromatic amines.

It has now been discovered that high molecular weight aminated polyols can be employed to enhance certain properties such as one or more of those selected from, for example, flexural modulus, tensile strength, tear strength, and the like in such RIM urethane systems usually without an unacceptable reduction in other properties of the polymer.

SUMMARY OF THE INVENTION

A process for preparing a molded polymer comprising reacting in a closed mold a reaction mixture comprising (a) an active hydrogen containing material comprising a primary or secondary amine terminated polyether, which active hydrogen containing material has an average equivalent weight of at least about 500, and at least about 25% of its active hydrogen atoms in the form of amine hydrogens, (b) at least one chain extender, and (c) an aliphatic polyisocyanate, polyisothiocyanate or mixture thereof wherein the NCX index is from about 0.6 to about 1.5 with the proviso that when the reaction mixture contains a trimerization catalyst, the NCX index is from about 0.6 to about 1.5.

The term NCX index is the ratio of the total number of NCO and/or NCS equivalents to the total number of hydrogen equivalents contained in the formulation.

Suitable groups containing hydrogen atoms reactive with NCO and/or NCS groups include, OH, SH, NH and the like.

DETAILED DESCRIPTION OF THE INVENTION

The amine terminated polyether used in the invention is a fully or partially aminated polyether having an equivalent weight of at least about 500 and at least 25%, preferably at least 50% of the active hydrogens in the form of amine hydrogens. Such amine-terminated polyether is advantageously prepared by the reductive amination of the corresponding polyether polyol, as described by Lesene and Godfrey in U.S. Pat. No. 3,161,682; Speranza in U.S. Pat. No. 3,231,619, Lee and Whitney in U.S. Pat. No. 3,236,895; Hubin and Smith in U.S. Pat. No. 3,436,359 and by Yeahey in U.S. Pat. No. 3,684,379 all of which are incorporated by reference. Suitable amine-terminated polyethers include those commercially available under the trade names Jeffamine D-2000 and Jeffamine T-5000, available from Texaco Chemicals. Relatively high molecular weight hydroxyl-containing compounds which can be aminated to prepare the amine-terminated polyether employed herein are those polyether polyols, polyester polyols and hydrocarbon derived polyols which have an average hydroxyl functionality of from about 2 to about 8, preferably from about 2 to about 4 and most preferably from about 2 to about 3 and an average hydroxyl equivalent weight of from about 500 to about 5000, preferably from about 1000 to about 3000 and most preferably from about 1500 to about 2500 including mixtures thereof. These materials may also be employed in the process of this invention, provided that the combination of amine terminated polyether and the polyol have at least 25% of their active hydrogen in the form of amine hydrogens.

Suitable relatively high molecular weight polyether polyols which can be employed to prepare the amine terminated polyether include those which are prepared by reacting an alkylene oxide, halogen substituted or aromatic substituted alkylene oxide or mixtures thereof with an active hydrogen-containing initiator compound.

Suitable such oxides include, for example, ethylene oxide, propylene oxide, 1,2-butylene oxide, 2,3-butylene oxide, styrene oxide, epichlorohydrin, epibromohydrin, mixtures thereof and the like.

Suitable initiator compounds include water, ethylene glycol, propylene glycol, butanediol, hexanediol, glycerine, trimethylol propane, pentaerythritol, hexanetriol, sorbitol, sucrose, hydroquinone, resorcinol, catechol, bisphenols, novolac resins, phosphoric acid, mixtures thereof and the like.

Also suitable as initiators for the relatively high molecular weight polyols include, for example, ammonia, ethylenediamine, diaminopropanes, diaminobutanes, diaminopentanes, diaminohexanes, diethylenetriamine, triethylenetetramine, tetraethylenepentamine, pentaethylenehexamine, ethanolamine, aminoethylethanolamine, aniline, 2,4-toluenediamine, 2,6-toluenediamine, diaminodiphenyloxide(oxydianiline), 2,4'-diaminodiphenylmethane, 4,4'-diaminodiphenylmethane, 1,3-phenylenediamine, 1,4-phenylenediamine, naphthylene-1,5-diamine, triphenylmethane-4,4',4''-triamine, 4,4'-di(-methylamino)-diphenylmethane, 1-methyl-2-methylamino-4-aminobenzene, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diaminodiphenylmethane and amine aldehyde condensation products such as the polyphenyl-polymethylene polyamines produced from aniline and formaldehyde, mixtures thereof and the like.

Suitable relatively high molecular weight polyester polyols which may be employed herein or to prepare the amine-terminated polyether include, for example, those prepared by reacting a polycarboxylic acid or anhydride thereof with a polyhydric alcohol. The polycarboxylic acids may be aliphatic, cycloaliphatic, aromatic and/or heterocyclic and may be substituted (e.g. with halogen atom) and/or unsaturated. Examples of carboxylic acids of this kind include succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids; such as oleic acid, which may be in admixture with monomeric fatty acids, terephthalic acid dimethyl ester; terephthalic acid bisglycol ester and the like. Mixtures of such acids or anhydrides may also be employed.

Examples of suitable polyhydric alcohols include ethylene glycol, 1,2-propylene glycol; 1,3-propylene glycol; 1,4-, 1,2- and 2,3-butylene glycol; 1,6-hexane diol; 1,8-octane diol; neopentyl glycol; cyclohexane dimethanol (1,4-bis-hydroxymethyl cyclohexane) 2-methyl-1,3-propane diol; glycerol; trimethylol propane; 1,2,6-hexane triol; 1,2,4-butane triol; trimethylol ethane; pentaerythritol; quinitol; mannitol; sorbitol; methyl glycoside; diethylene glycol; triethylene glycol; tetraethylene glycol; polyethylene glycol; dipropylene glycol; polypropylene glycols; dibutylene glycol; polybutylene glycols and the like. The polyesters may contain some terminal carboxyl groups. It is also possible to use polyesters of lactones such as caprolactone, or hydroxy carboxylic acids such as hydroxy caproic acid.

Suitable high molecular weight polyols also include, hydrocarbon polyols such as, for example, hydroxy terminated polybutadiene rubbers commercially available from Arco Chemical Company as Poly B-D 2000X.

Other polyols which can be employed herein include polymer-containing polyols such as, for example, those disclosed in U.S. Pat. Nos. Re. 29,118 (Stamberger), Re. 28,715 (Stamberger), Re. 29,014 (Pizzini et al), 3,869,413 (Blankenship et al) and 4,390,645 (Hoffman et al) all of which are incorporated herein by reference.

The classical function, utility and definition of chain extenders in polyurethanes are suitably described in U.S. Pat. No. 3,233,025, col. 4, lines 5–28; U.S. Pat. No. 3,915,937, col. 1, lines 20–27 and 36–44; U.S. Pat. No. 4,065,410, col. 1, lines 42–44, col. 2, lines 20–21 and col. 4, line 60 to col. 5, line 41; U.S. Pat. No. 4,048,105, col. 1, lines 30–38 and col. 2, lines 4–13. All of the above are incorporated herein by reference.

Suitable hydroxyl-containing chain extenders which are free of aliphatic amine hydrogen atoms include, for example, ethylene glycol, propylene glycol, trimethylol propane, 1,4-butane diol, diethylene glycol, dipropylene glycol, bisphenols, hydroquinone, catechol, resorcinol, triethylene glycol, tetraethylene glycol, dicyclopentadienediethanol, glycerine, low molecular weight ethylene and/or propylene oxide derivatives of glycerine, ethylene diamine, diethylenetriamine, mixtures thereof and the like.

Suitable aliphatic amine-containing chain extenders having at least one primary amine group which can be employed herein include, for example, ethylene diamine, 1,3-diaminopropane, 1,4-diaminobutane, isophoronediamine, diethylenetriamine, ethanolamine, aminoethylethanolamine, diaminocyclohexane, hexamethylenediamine, methyliminobispropylamine, iminobispropylamine, bis(aminopropyl)piperazine, aminoethyl piperazine, 1,2-diaminocyclohexane, polyoxyalkyleneamines, bis-(p-aminocyclohexyl)methane, triethylenetetramine, tetraethylenepentamine, mixtures thereof and the like.

Particularly suitable are the aminated polyoxypropylene glycols having an average amino hydrogen equivalent weight of from about 60 to about 110.

The term aliphatic amine as employed herein includes also the cycloaliphatic amines and heterocyclic aliphatic amines so long as they contain at least one primary amine group.

Suitable aromatic amines which can be employed herein as a chain extender which is essentially free of aliphatic amine hydrogen atoms include, for example, 2,4-bis(p-aminobenzyl)aniline, 2,4-diaminotoluene, 2,6-diaminotoluene, 1,3-phenylenediamine, 1,4-phenylenediamine, 2,4'-diaminodiphenylmethane, 4,4'-diaminodiphenylmethane, naphthalene-1,5-diamine, triphenylmethane-4,4',4"triamine, 4,4'-di-(methylamino)-diphenylmethane, 1-methyl-2-methylamino-4-aminobenzene, polyphenyl-polymethylene polyamines, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diaminodiphenylmethane, 4,4'-methylene-bis(2,6-diisopropylaniline), mixtures thereof and the like.

The use of special mixtures of the chain extenders is fully described by Vanderhider and Lancaster in U.S. Pat. No. 4,269,945 which is incorporated herein by reference.

Suitable polyisocyanates include the organic aliphatic polyisocyanates, polyisothiocyanates or mixtures thereof.

Suitable organic aliphatic polyisocyanates include, 1,6-hexamethylene diisocyanate, 1,4-cyclohexyl diisocyanate, isophorone diisocyanate, 1,4-bis-isocyanatomethyl-cyclohexane, m- or p-tetramethylxylene diisocyanate, as well as halogenated derivatives of aromatic isocyanates such as toluene diisocyanate or diphenylmethane diisocyanate.

Also suitable are the corresponding polyisothiocyanates, and NCO or NCS terminated prepolymers or quasi-prepolymers prepared from such polyisocyanates and/or polyisothiocyanates and suitable active hydrogen containing materials. Suitable such prepolymers include those having an —NCO content from about 5–30% by weight, especially about 10–18% by weight prepared by reacting a stoichiometric excess of said aliphatic polyisocyanates with a polyol having an equivalent weight of about 30–3000.

The polymers can be prepared either in the presence or absence of a catalyst. Suitable catalysts which may be employed herein include, for example, organo-metal compounds, tertiary amines, alkali metal alkoxides, mixtures thereof and the like.

Suitable organo-metal catalysts include, for example, organo-metal compounds of tin, zinc, lead, mercury, cadmium, bismuth, antimony, iron, manganese, cobalt, copper, vanadium and the like such as, for example, metal salts of a carboxylic acid having from about 2 to about 20 carbon atoms including, for example, stannous octoate, dimethyltin dilaurate, dibutyltin dilaurate, dibutyltin diacetate, ferric acetyl acetonate, lead octoate, lead oleate, phenylmercuric propionate, lead naphthenate, manganese naphthenate, copper naphthenate, vanadyl naphthenate, cobalt octoate, cobalt acetate, copper oleate, vanadium pentoxide, mixtures thereof and the like.

Suitable amine catalysts include, for example, triethylenediamine, triethylamine, tetramethylbutanediamine, N,N-dimethylethanolamine, N-ethylmorpholine, bis(2-dimethylaminoethyl)ether, N-methylmorpholine, N-ethylpiperidine, 1,3-bis-(dimethylamino)-2-propanol, N,N,N',N'-tetramethylethylendiamine, mixtures thereof and the like.

Suitable alkali metal alkoxides which can be employed as catalysts for urethane formation include, for example, sodium ethoxide, potassium ethoxide, sodium propoxide, potassium propoxide, sodium butoxide, potassium butoxide, lithium ethoxide, lithium propoxide, lithium butoxide, alkali metal salts of polyols such as described in U.S. Pat. No. 3,728,308, mixtures thereof and the like.

Preferably, these urethane catalysts are in liquid form, but if they are inherently a solid at the application temperature, then they may be dissolved in an appropriate liquid, such as, for example, dipropylene glycol.

The amine catalysts, when employed, can be employed in quantities of from about 0.001 to about 5, preferably from about 0.01 to about 1 part per 100 parts of total polyol employed depending upon the activity of the catalyst. Organometallic catalyst are usually employed in smaller amounts, 1% or less, preferably 0.5% or less, due to their greater activity. Very weak catalysts could possibly be employed in quantities above 5 parts per 100 parts of polyol.

Suitable trimerization catalysts which can be employed herein include, for example, the zwitterions disclosed by Kresta and Shen in U.S. Pat. No. 4,111,914 and the tertiary amines, alkali metal salts of lower alkanoic acids, mixtures thereof and the like in U.S. Pat. No. 4,126,741 (Carleton et al) all of which are incorporated herein by reference.

The zwitterions can also function as a catalyst for urethane formation i.e. the NCX—OH reaction.

If desired, the densities of the polyurethanes produced herein can be reduced by incorporating a blowing agent into the formulation. Suitable such blowing agents are fully described in U.S. Pat. No. 4,125,487 and in U.S. Pat. No. 3,753,933 and so much of these patents as pertain to blowing agents is incorporated herein by reference. Particularly suitable blowing agents include the low boiling halogenated hydrocarbons such as methylene chloride and trichloromonofluoromethane.

Another suitable method for reducing the density is by frothing by injecting an inert gas into the mixture of urethane forming components. Suitable such inert gases include, for example, nitrogen, oxygen, carbon dioxide, xenon, helium, mixtures thereof such as air and the like.

If desired, cell control agents can be employed, particularly when preparing foams or products of reduced density and/or to assist in paintability of the polyurethane. Suitable cell control agents which can be employed herein include silicone oils such as, for example, DC-193, DC-195, DC-197 and DC-198 commercially available from Dow Corning Corp.; SF-1034, PFA-1635, PFA-1700 and PFA-1660 commercially available from General Electric Co.; and L-520, L-5320 and L-5340 commercially available from Union Carbide Corp.; and B-1048commercially available from PH. Goldschmidt, AG., mixtures thereof and the like.

The polymers of the present invention may additionally contain, if desired, coloring agents, density reducing agents, reinforcing agents, mold release agents, fire retardant agents, fillers, modifiers and the like.

Suitable liquid and solid modifiers are disclosed and described in U.S. Pat. Nos. 4,000,105 and 4,154,716 and so much thereof as pertains to suitable modifier substances are incorporated herein by reference. However, any such modifier described therein which fulfills the definition of any of the other components as described in this application are not considered as modifiers but rather as one of the components of the present invention.

Particularly suitable as the modifier or filler substance are fiberglass reinforcement fibers, particularly those having lengths of from about 1/16 inch (0.16 cm) to about ½ inch (1.27 cm) and milled glass fibers having a maximum length of 1/16 inch (0.16 cm), ⅛ inch (0.32 cm) or ¼ inch (0.64 cm) and the like. Other particularly suitable fillers are mica, wollastonite, fumed silica, and the like.

The components which react to form the polyurethanes of the present invention can be shaped or formed into useful articles by injecting the reactive mixture into molds which are capable of withstanding the exotherm of the polymerizing mass and are non-reactive with and are insoluble when in contact with the liquid reactive mixture. Particularly suitable molds are those made of metal such as aluminum, copper, brass, steel and the like. In some instances non-metal molds can be employed such as those made of, for example, polyethylene, polypropylene, polyethylene terephthalate, silicone elastomers and the like.

Particularly suitable injection methods for the RIM applications of the present invention include those disclosed in the aforementioned articles by Ludwico et al, Gerkin et al, British patent No. 1,534,258 and the book by F. Melvin Sweeney all of which are incorporated herein by reference.

To prevent the solidifying mass from adhering to the mold surface, it may be necessary to precoat the mold surface with a film of a suitable mold release agent much as, for example, hydrocarbon wax or a polysiloxane preparation or a polytetrafluoroethylene coating, or employ an internal mold release agent in the composition.

When injecting a relatively rapid-setting blend into massive metal molds, it may be necessary for rapid demolding to preheat the molds to an appropriate temperature so that the mold will not abstract the heat of polymerization from the reactive mass and inappropriately delay the solidification time expected of a given formulation. Mold temperatures from about 50°–200° C. are generally adequate. On the other hand, thin wall metal molds could exhibit a minimal "heat sink" effect on relatively large cross section castings and thus, these thin wall metal molds may not require preheating.

The polymer prepared in the invention is characterized by having excellent physical properties, and particularly excellent heat distortion properties. In addition, certain of these polymers, particularly those prepared using 1,6-hexenediisocyanate, exhibit the unusual property of having superior impact strength at low temperatures then at ambient temperatures.

The following examples are illustrative of the present invention and are not to be construed as to limiting the scope thereof in any manner.

EXAMPLES 1-2

Polymer molding Sample Nos. 1-2 are prepared according to the following general procedure:

A "B-side" formulation containing 5 parts diethyltoluene diamine (DETDA), 12 parts of an amine terminated 5000 molecular weight poly(propylene oxide)-triol, (T-5000 sold by Texaco Chemical), 8.0 parts of an amine-terminated 2000 molecular weight poly(propylene oxide)diol (D-2000, from Texaco Chemical) and catalysts as indicated in Table I are prepared by blending the components. This mixture is reacted via a reaction injection molding (RIM) process with a quasi-prepolymer prepared by reacting 1,6 hexane diisocyanate (HXDI) with a 2000 molecular weight polypropylene oxide diol to obtain a prepolymer having 22% by weight —NCO groups.

The moldings are prepared using a Martin-Sweets RIM machine. The prepolymer is preheated to 105° F. and the B-side to 150° F. prior to injection into the mold. The ratio of the isocyanate to the B-side is chosen to provide an index of 105. The mold is preheated to 93° C. The residence time of the molding in the mold (demold time) and the post-cure conditions are as indicated in Table I.

The moldings (0.130" thickness) are prepared using an aluminum mold. Part weights are about 146–147 g.

Testing as indicated in Table I is performed. Both samples exhibit excellent physical properties.

TABLE I

| Sample No. | 1 | 2 |
|---|---|---|
| Amine Catalyst % | 0 | 0.5 |
| Index | 105 | 105 |
| Mold Temp. (°C.) | 93 | 93 |
| Demold Time (min) | 1 | 1 |
| Post Cure °C./minutes | 150/120 | 150/60 |
| Specific Gravity | 1.04 | 1.08 |
| Flexural Modulus (psi)[2] | 7,922 | 19,309 |
| Tensile Strength (psi)[3] | 1,908 | 2,168 |
| Elongation (%)[3] | 287 | 102 |
| Heat Sag (in)[4] | 0.81 | 1.03 |
| Shore D hardness | 31.2 | 46 |
| Die "C" tear (pli)[5] | 245.8 | 247 |

[1]A 33% solution of triethylene diamine. % by weight based on certain hydrogen containing materials.
[2]ASTM D-790
[3]ASTM 412-68
[4]Determined with a 6" overhand at 325° F. for 30 minutes
[5]ASTM D-624-10

EXAMPLES 3-4

Examples 3-4 are prepared according to the general procedure described in Examples 1-2, except 10 parts by weight DETDA are employed in order to provide a higher modulus polymer. Catalysts, molding and curing conditions, and properties of the molded polymer are as described in Table II. All examples have generally excellent physical properties.

Sample No. 3 illustrates a particularly surprising aspect of this invention. The impact strength of the elastomer is higher at −20° F. than at room temperature, which is contrary to the usual behavior of plastics.

| Sample No. | 3 | 4 |
|---|---|---|
| Index | 0 | 0 |
| Mold Temp. (°C.) | 93 | 93 |
| Demold Time (min) | 1 | 5 |
| Post Cure (°C./minutes) | 150/120 | 150/60 |
| Specific Gravity | 1.1 | 1.09 |
| Flexural Modulus (psi)[1] | 41,500 | 41,100 |
| Tensile Strength (psi)[2] | 3,000 | 3,000 |
| Elongation %[2] | 83.5 | 89.7 |
| Heat Sag (in)[3] | 0.44 | 0.53 |
| Shore D hardness | 59.2 | 58.6 |
| Die "C" tear strength (pli)[4] | 333 | 348 |
| Gardner Impact Strength, −20° F. (in-lb) | 320 | 320 |
| Gardner impact strength, R.T. (in-lb) | 232 | N.D. |

N.D. - Not determined
[1]ASTM - D790
[2]ASTM - 412-68
[3]Determined with a 6" overhang at 325° F. for 30 minutes
[4]ASTM D-624-10

We claim:
1. A process for preparing a molded polymer comprising reacting in a closed mold a reaction mixture comprising
   (a) an active hydrogen containing material comprising primary or secondary amine terminated polyether having at least about 25% of its active hydrogens in the form of amine hydrogens which active hydrogen containing material has an average equivalent weight of at least about 500,
   (b) at least one chain extender, and
   (c) an aliphatic polyisocyanate, polyisothiocyanate or mixture thereof wherein the NCX index is from about 0.6 to about 1.5 with the proviso that when the reaction mixture contains a trimerization catalyst, the NCX index is from about 0.6 to about 1.5.
2. The process of claim 1 wherein component (b) is selected from the group consisting of
   (1) hydroxyl-containing materials which are essentially free of aliphatic amine hydrogen atoms, have an average OH functionality of from about 2 to about 4 and have an average OH equivalent weight of from about 30 to about 120; and
   (2) aromatic amine-containing materials which are essentially free of aliphatic amine hydrogen atoms and which contain at least two aromatic amine hydrogen atoms;
   (3) aliphatic amine-containing materials having at least one primary amine group, an average aliphatic amine hydrogen functionality of from about 2 to about 16 and an average aliphatic amine hydrogen equivalent weight of from about 15 to less than about 500; and
   (4) mixtures thereof.
3. The process of claim 1 wherein component (a) comprises a primary amine terminated polyether having a functionality of about 2 to 3 and an average equivalent weight of about 500–2000.
4. The process of claim 3 wherein the aliphatic polyisocyanate comprises isophorone diisocyanate, hexamethylene diisocyanate, tetramethyl xylene diisocyanate, 1,4 cyclohexane diisocyanate or a halogenated derivative of toluene diisocyanate or diphenyl methane diisocyanate.
5. The process of claim 3 wherein the aliphatic polyisocyanate is a prepolymer or quasi-prepolymer of an aliphatic diisocyanate and a polyol.
6. The process of claim 4 wherein component (b) comprises an aromatic diamine.
7. The process of claim 6 wherein component (b) is diethyltoluene diamine or a mixture thereof with an aliphatic diamine.

* * * * *